US012616990B2

(12) United States Patent
Price et al.

(10) Patent No.: US 12,616,990 B2
(45) Date of Patent: May 5, 2026

(54) BOOM MOUNTED SPRAY NOZZLE ASSEMBLY WITH COMPACT MULTI SPRAY NOZZLE DESIGN

(71) Applicant: Spraying Systems Co., Wheaton, IL (US)

(72) Inventors: Trevor Price, Crystal Lake, IL (US); Timothy Winter, Vernon Hills, IL (US); Marc Arenson, Bartlett, IL (US)

(73) Assignee: Spraying Systems Co., Wheaton, IL (US)

( * ) Notice: Subject to any disclaimer, the term of this patent is extended or adjusted under 35 U.S.C. 154(b) by 458 days.

(21) Appl. No.: 18/011,158

(22) PCT Filed: Jun. 18, 2021

(86) PCT No.: PCT/US2021/038096
§ 371 (c)(1),
(2) Date: Dec. 16, 2022

(87) PCT Pub. No.: WO2021/257993
PCT Pub. Date: Dec. 23, 2021

(65) Prior Publication Data
US 2023/0405625 A1 Dec. 21, 2023

Related U.S. Application Data

(60) Provisional application No. 63/040,756, filed on Jun. 18, 2020.

(51) Int. Cl.
*B05B 15/16* (2018.01)
*A01C 23/04* (2006.01)
(Continued)

(52) U.S. Cl.
CPC ............. *B05B 15/16* (2018.02); *A01M 7/006* (2013.01); *B05B 12/008* (2013.01);
(Continued)

(58) Field of Classification Search
CPC ..... B05B 15/16; B05B 15/658; B05B 12/008; B05B 12/087; B05B 1/14; B05B 1/3006; A01M 7/006; A01M 7/0042; A01C 23/047
(Continued)

(56) References Cited

U.S. PATENT DOCUMENTS 3,863,841 A * 2/1975 Berthoud .............. B05B 15/658
239/536
3,931,930 A * 1/1976 Waldrum ............ A01M 7/0042
239/587.2
(Continued)

FOREIGN PATENT DOCUMENTS

CA 2135962 C 5/1995
CN 206868461 U 1/2018
(Continued)

OTHER PUBLICATIONS

European Patent Office, International Search Report in corresponding International Application No. PCT/US2021/038096, dated Oct. 8, 2021 (13 pages).

*Primary Examiner* — Steven M Cernoch
(74) *Attorney, Agent, or Firm* — Leydig, Voit & Mayer, Ltd.

(57) ABSTRACT
A liquid spray boom for supporting a plurality of spray nozzle assemblies each having a compact design that enables transfer and storage of the spray boom with lesser tendency for damage. The spray nozzle assemblies each include a liquid inlet section and a pair of spray nozzle liquid supply and support legs extending from the liquid inlet section in forward transverse relation to the spray boom and at an acute angle to each other. A spray nozzle is removably mounted on each nozzle body liquid supply leg with a respective check valve disposed in rearward relation to the spray nozzle. The liquid inlet section, Y body, and support-
(Continued)

ing components for the spray nozzles and check valve are adapted for quick disconnect assembly and disassembly.

18 Claims, 9 Drawing Sheets

(51) Int. Cl.

| | | |
|---|---|---|
| *A01M 7/00* | (2006.01) |
| *B05B 12/00* | (2018.01) |
| *B05B 12/08* | (2006.01) |
| *B05B 15/658* | (2018.01) |

(52) U.S. Cl.
CPC .......... *B05B 12/087* (2013.01); *B05B 15/658* (2018.02); *A01C 23/047* (2013.01); *A01M 7/0042* (2013.01)

(58) Field of Classification Search
USPC .......................... 239/426, 433, 434, 722–754
See application file for complete search history.

(56) References Cited

U.S. PATENT DOCUMENTS

| | | | |
|---|---|---|---|
| 5,544,813 A | 8/1996 | Giles et al. |
| 8,675,646 B2 | 3/2014 | Jung et al. |
| 9,532,563 B2 * | 1/2017 | Arenson ............. A01M 7/0089 |

FOREIGN PATENT DOCUMENTS

| | | | | |
|---|---|---|---|---|
| CN | 108160352 A | 6/2018 | |
| GB | 709151 A | * 1/1954 | ............ A01M 7/006 |
| JP | S5443616 U | 3/1979 | |
| RU | 153506 U1 | 7/2015 | |
| RU | 2570868 C2 | 12/2015 | |
| RU | 192305 U1 | 9/2019 | |
| RU | 2717296 C1 | 3/2020 | |
| SU | 1139514 A1 | 2/1985 | |

* cited by examiner

BOOM MOUNTED SPRAY NOZZLE ASSEMBLY WITH COMPACT MULTI SPRAY NOZZLE DESIGN

CROSS-REFERENCE TO RELATED APPLICATIONS

This patent application claims the benefit of U.S. Provisional Patent Application No. 63/040,756 filed Jun. 18, 2020, which is incorporated by reference.

FIELD OF THE INVENTION

The present invention relates generally to liquid spray booms such as those pulled in the field behind a tractor or the like for agricultural spraying, and more particularly, to an improved spray nozzle assembly for use on such spray booms.

BACKGROUND OF THE INVENTION

Agricultural spray booms carry a large number of laterally spaced spray nozzle assemblies along the length of the boom. Each spray nozzle assembly commonly comprises a plurality of spray nozzles, as well as, one or more check valves for immediately interrupting the discharge of liquid from the spray nozzles upon shut off of the liquid supply for preventing waste and over application of the liquid chemical, which further adds to the bulk and size of each assembly.

In recent years, relatively sophisticated check valves are being used for each spray nozzle for electronically controlling and monitoring liquid spray of agricultural chemicals. Such control and check valves are of a size that substantially increases the footprint of the spray nozzle assembly relative to the liquid supply boom. Electrical wiring of the electronic check valves further must be incorporated into each spray nozzle assembly.

Such liquid spray booms can be relatively long in length, such as 80 feet or more, to maximize spraying during each path of travel. To facilitate transport and storage of the spray boom when not in use, the spray booms have pivot joints that enable opposite sides or segments of the boom to be folded into side by side relation to each other. Due to the bulk and size of the spray nozzle assemblies and the associated check valves and their protuberance from the spray boom, upon positioning of the spray boom sections into overlying side by side relation, the spray nozzle assemblies can come into engaging and damaging contact with each other, necessitating repair or replacement and downtime of the sprayer.

OBJECTS AND SUMMARY OF THE INVENTION

It is an object of the present invention to provide a liquid spray boom having a multiplicity of spray nozzle assemblies with associated liquid check or control valves along the length thereof designed for more reliably permitting folding or pivoting of sections of the boom into a side by side relation without interfering, contacting engagement of the spray nozzle assemblies.

Another object is to provide a spray nozzle assembly having a multiplicity of relatively large electronic check valves that has a compact design which enables protective mounting on the liquid spray boom.

A further object is to provide a spray nozzle of the foregoing type having electronic check valves which facilitate protective mounting of the spray nozzle assembly on the liquid supply spray boom and wiring of respective electronic check valves.

Another object is to provide a spray nozzle assembly of the foregoing type that is relatively simple in construction and which lends itself to economical manufacture.

Other objects and advantages of the invention will become apparent upon reading the following detailed description and upon reference to the drawings.

Figure 1:
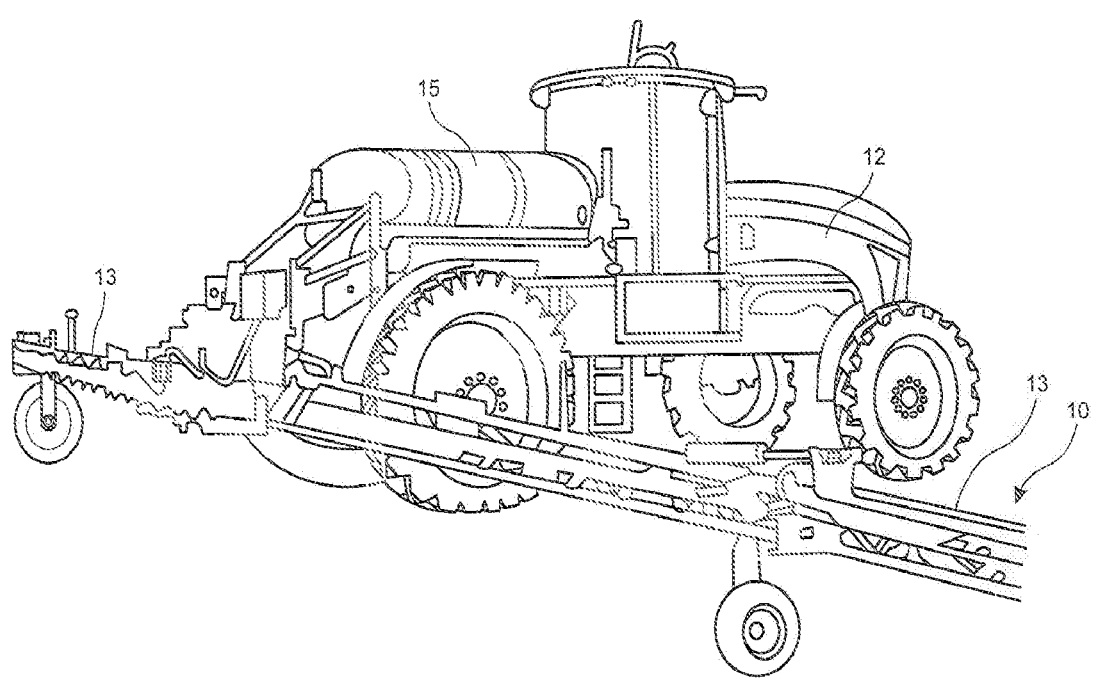
FIG. 1 is a perspective of an illustrated spray boom in accordance with the invention being pulled by a motorized tractor.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

Referring now more particularly to the drawings, there is shown an illustrative spray boom 10 (FIG. 1) having a plurality of liquid spray nozzle assemblies 11 (FIG. 2) for spraying chemicals or other liquids onto a field along strips corresponding to the width of the spray boom 10 as it is being pulled by a tractor 12 or the like. The spray boom 10 in this case includes laterally extending support members 13 which support a liquid supply conduit 14 (FIG. 14) along the length thereof that is coupled to a liquid supply tank 15 carried by the tractor 12. As is known in the art, the spray boom support members 13 may comprise a plurality of elongated segments or sections that are coupled together to permit pivoting of the spray boom sections into adjacent side by side relation for transport or storage.

Figure 6:
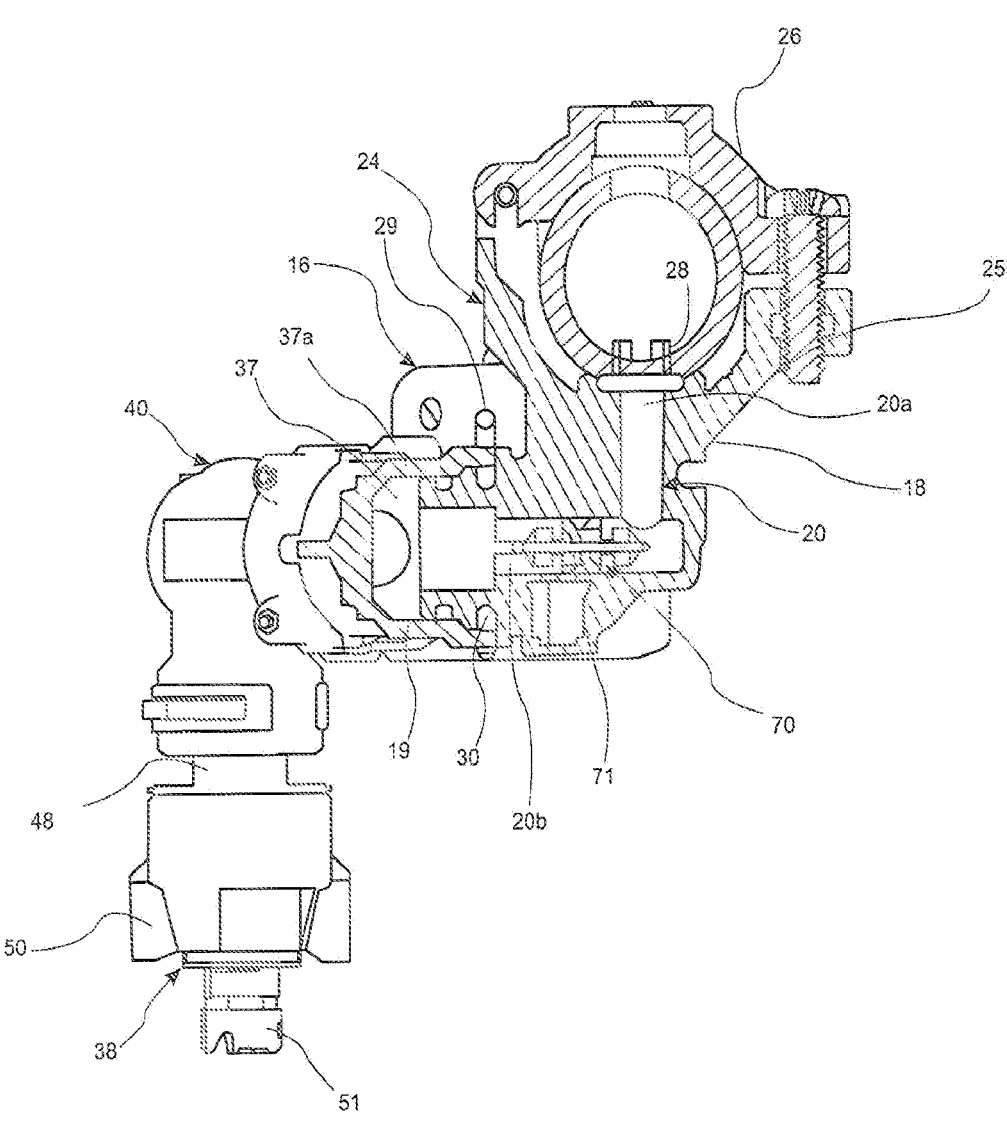
FIG. 6 is an enlarged vertical section of the illustrated nozzle assembly taken in the plane of the line 6-6 in FIG. 4.

The spray nozzle assemblies 11 in this instance each are supported in depending fashion from the spray boom liquid supply conduit 14. To that end, the illustrated spray nozzle assemblies 11 each include a nozzle support body 16 which comprises a mounting and liquid inlet section 18 supported in depending relation to the elongated liquid supply boom 14 and a liquid outlet section 19 extending transversely, in this case forwardly, of the liquid inlet section 18 and the spray boom liquid supply conduit 14. The liquid inlet section 18 in this instance has a right angle liquid passage 20 having an upstream passage section 20a communicating with the spray boom liquid supply conduit 14 and a transverse passage section 20b extending forwardly thereof (FIG. 6). It will be understood that the terms "upper", "bottom", "front", "back" that may be as used herein are not limited to their literal meaning, but are intended as relative terms in relation to the spray nozzle assembly and the spray boom illustrated in the drawings.

Figure 2:
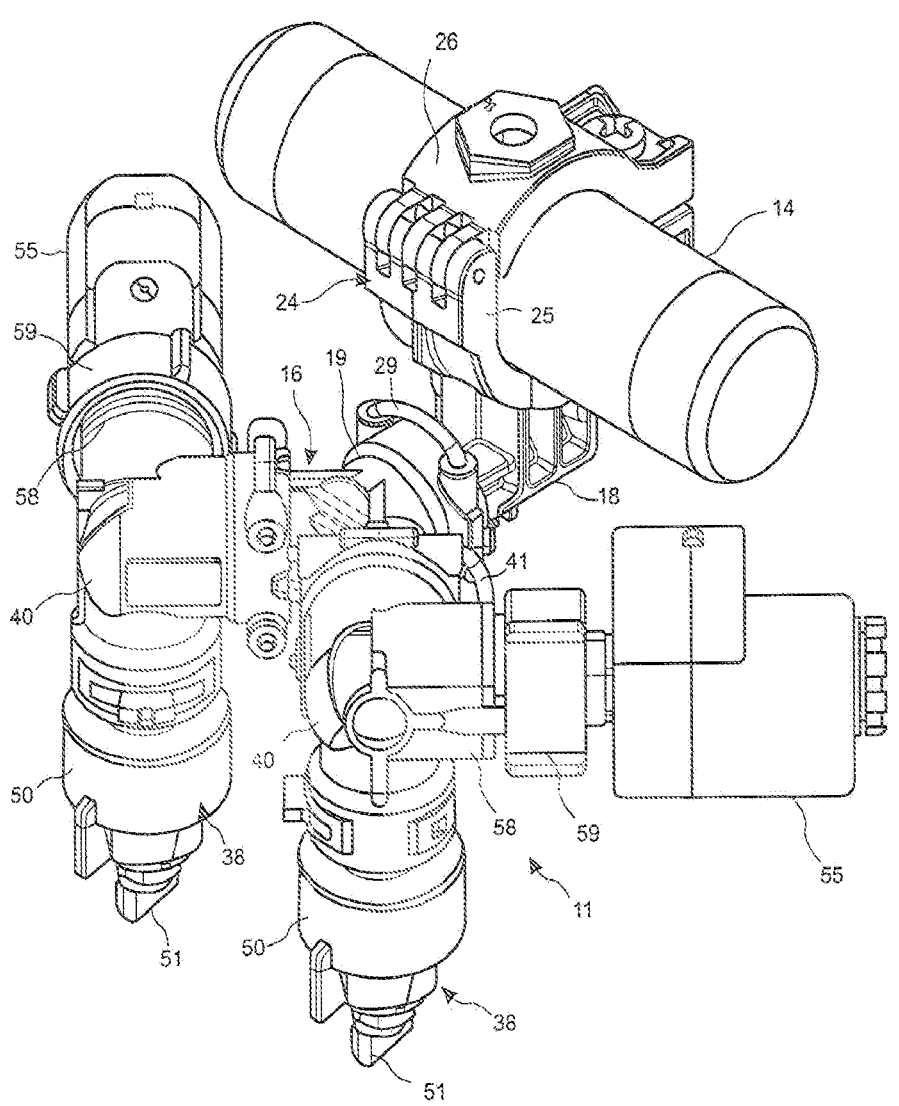
FIG. 2 is an enlarged perspective of one of the spray nozzle assemblies mounted on the liquid spray boom shown in FIG. 1.

For securing the spray nozzle assembly 11 to the spray boom liquid supply conduit 14, the liquid inlet section 18 includes a clamping device 24 having a cradle-shaped mounting flange 25 positioned adjacent an underside of the spray boom liquid supply conduit 14 and a clamping element 26 pivotably connected to one end of the mounting flange 25 and positionable over the spray boom liquid supply conduit 14 for securement to an opposite end of the mounting flange 25 (FIGS. 2 and 6). The mounting flange 25 has a nipple 28 which extends upwardly into the liquid supply conduit 14 through which a pressurized liquid from the liquid supply conduit 14 enters for direction through the inlet section passage 20 to the liquid outlet section 19. The liquid outlet section 19 in this instance is secured to the liquid inlet section 18 by a quick disconnect coupling comprising a U-shaped pin or clip 29 having opposite legs that extend through passages in an upstream end of the liquid outlet section 19 and an outer angular retention groove 30 (FIGS. 2 and 6) in the liquid inlet section 18. It will be understood that in the illustrated embodiment the liquid inlet and outlet sections 18, 19 are separate parts releasably secured to each other, alternatively, they could be integrally formed as a single part.

Figure 4:
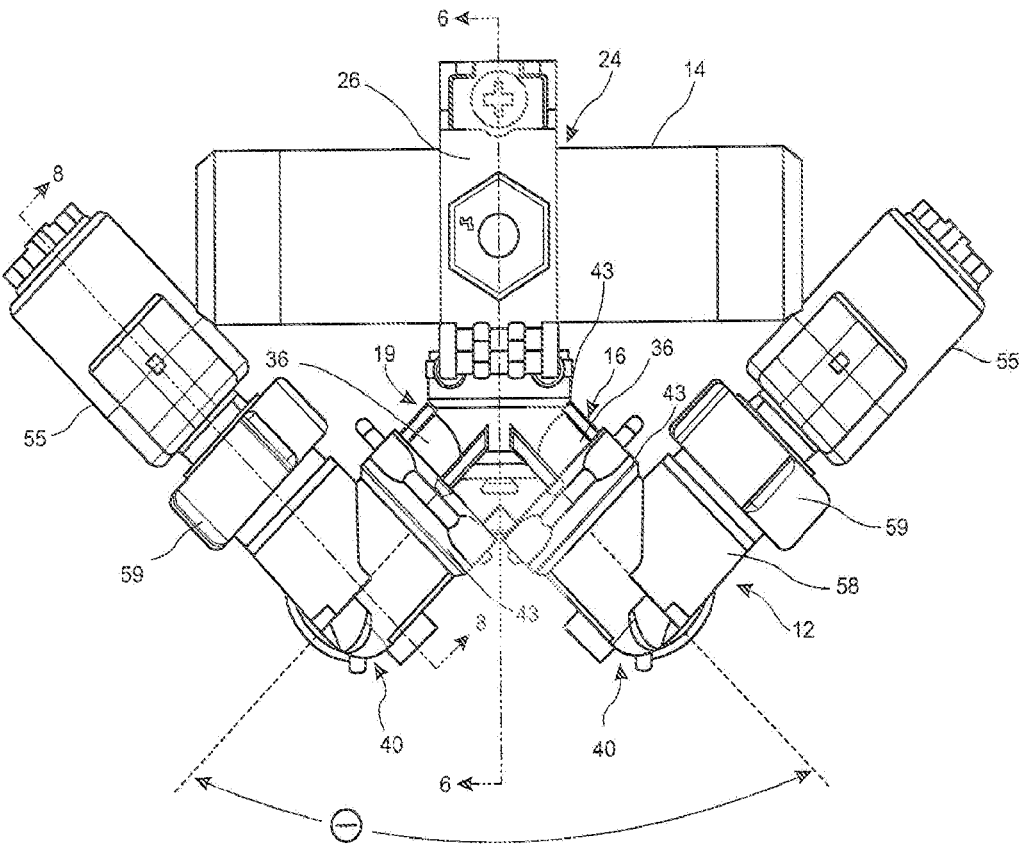
FIG. 4 is a top plan view of the spray nozzle assembly shown in FIG. 2.
Figure 5:
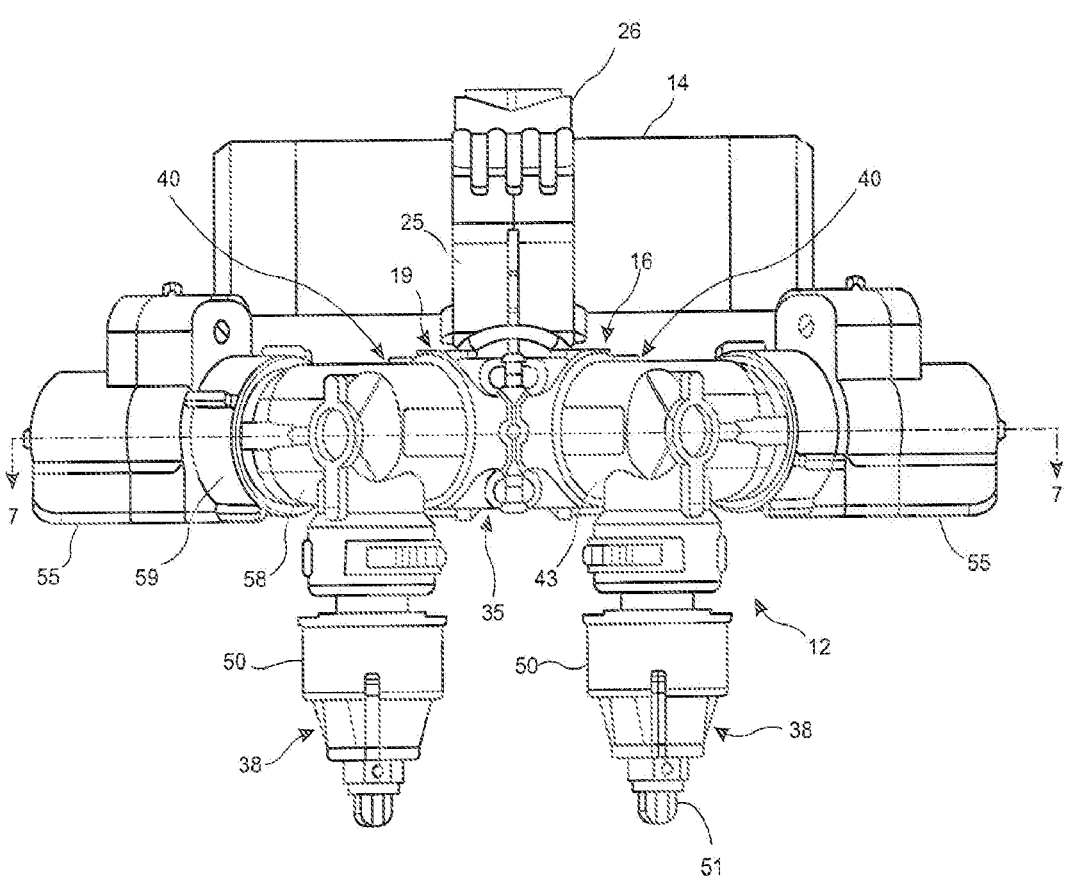
FIG. 5 is a front plan view of the spray nozzle assembly shown in FIG. 2.
Figure 7:
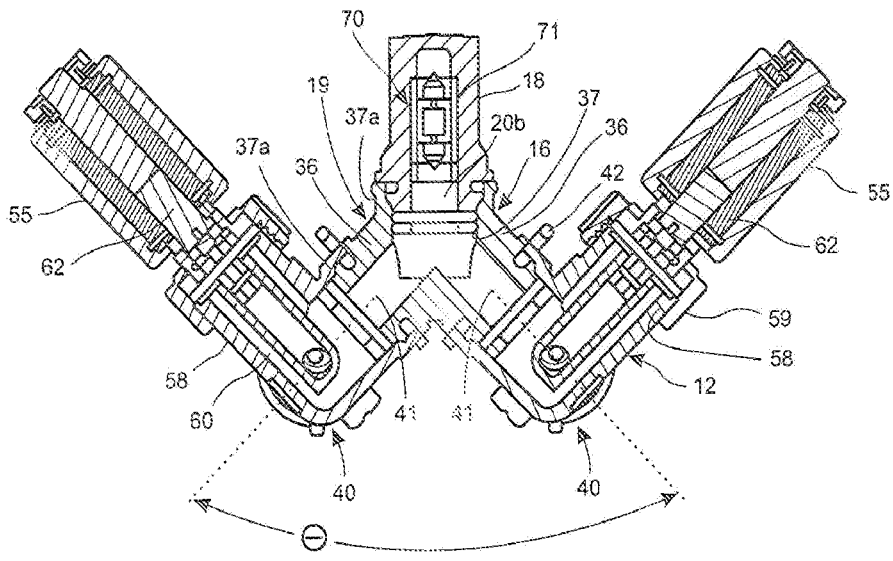
FIG. 7 is a horizontal section of the illustrated spray nozzle assembly taken in the plane of line 7-7 in FIG. 5.

In accordance with an important aspect of the present embodiment, the liquid outlet section 19 includes a Y configured body 35 (hereinafter "Y body") having a pair of liquid supply legs 36 extending laterally of the liquid inlet section 18 and spray boom liquid supply conduit 14 at an acute angle θ to each other (FIGS. 4 and 7), each for supporting a respective liquid spray nozzle 38 in close underlying relation to the spray boom liquid 10 so as to minimize the chance of damaging interference of the spray nozzle assemblies when sections of the spray boom 10 are moved into side by side folded relation to each other for transport or storage. The Y body 35 has a liquid inlet passage 37 in an upstream hub 37a communicating with the liquid inlet section passage 20 and a pair of angled liquid passages 41 each communicating through a respective leg 36 of the Y body 35 (FIG. 7). The legs 36 of the illustrated Y body 35 are disposed at an angle θ of about 45 degrees with respect to each other for positioning the spray nozzles 38 in relatively close laterally spaced relation to an underside of the spray boom liquid supply conduit 14. Alternatively, the legs 36 of the Y body 35 could be disposed at angle θ of between 30 and 60 degrees, depending upon the manner in which sections of the spray boom 10 are moved into stored or travel relation to each other.

Figure 3:
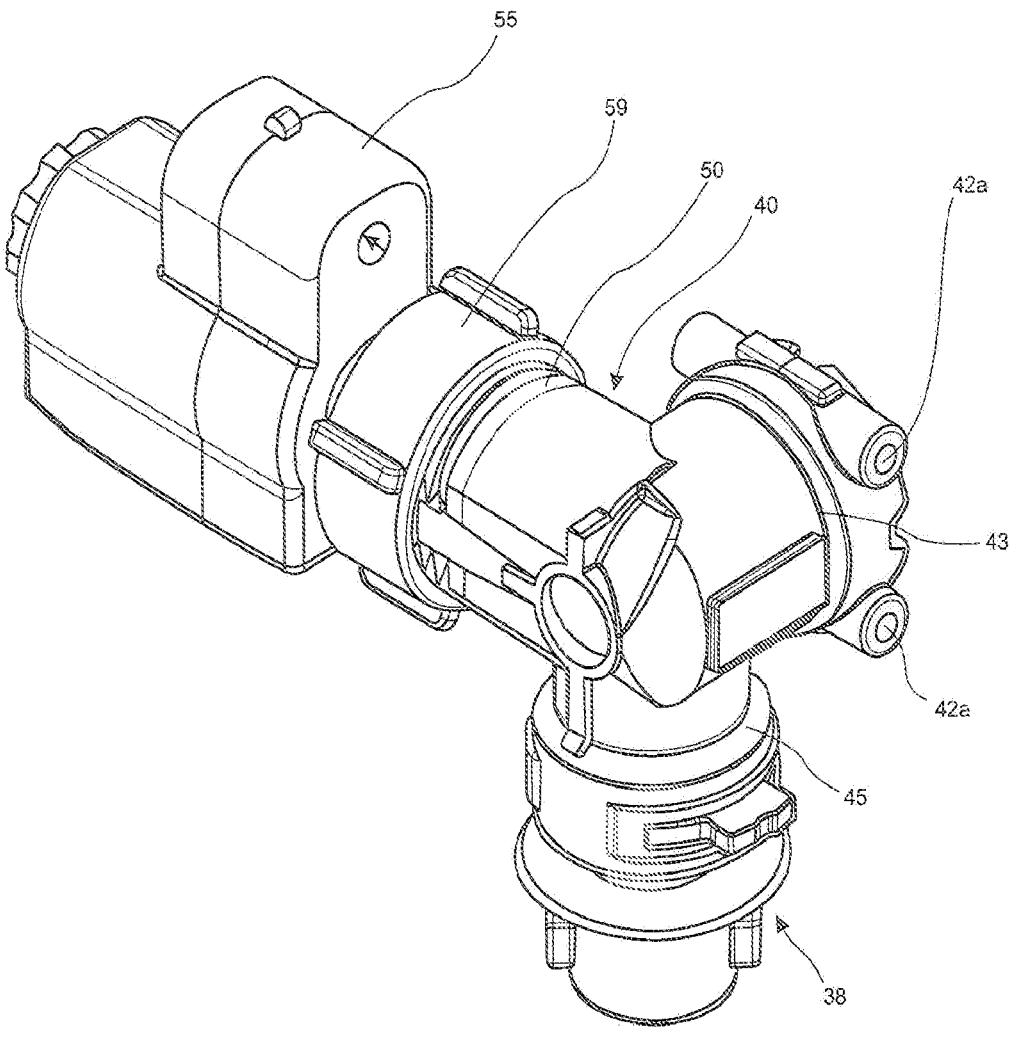
FIG. 3. is an enlarged perspective of one of the end bodies of the spray nozzle assembly shown in FIG. 2 which supports a respective spray nozzle and electronic check valve.
Figure 8:
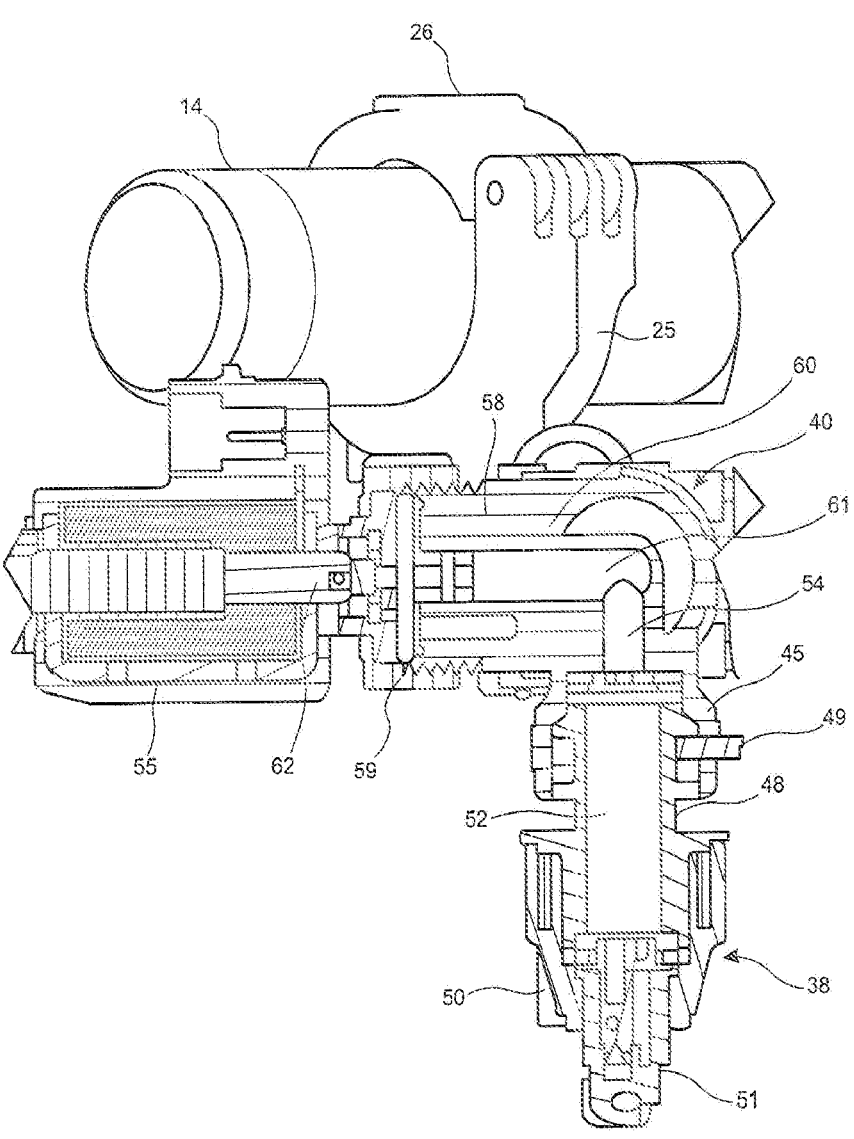
FIG. 8 is an enlarged vertical section of the illustrated spray nozzle assembly taken in the plane of line 8-8 in FIG. 4.

In carrying out the present embodiment, the legs 36 of the Y body 35 each support the respective spray nozzle 38 in depending close underlying relation to the spray boom liquid supply conduit 14. In the illustrated embodiment, each Y body leg 36 has an end body 40 at a terminal end for supporting the depending spray nozzle 38. Each end body 40 has an entry section 43 coupled to the end of the respective Y body leg 36 by a quick disconnect U-pin or clip 42 positioned through passages 424 in the entry section 43 (FIGS. 3 and 7). In the illustrated embodiment, an elongated nozzle mounting stem 48 having an upstream end fixed within a receptacle 45 of the end body 40, again by a removable clip 49, and a downstream end upon which the spray nozzle 38 is mounted, such as by a conventional quick disconnect coupling, such as shown in U.S. Pat. No. 6,749, 134 assigned to the same assignee as the present application, the disclosure of which is incorporated by reference. The spray nozzle 38 in this case comprises a cap 50 which carries or is formed with a spray tip 51 and is operable for quick disconnect coupling onto ramming and locking locks of the nozzle mounting stem 48 (FIG. 8). The mounting stem 48 in this case has a central liquid passage 52 communicating between a liquid outlet passage 54 of the end body 40 and the spray nozzle 38, as will become apparent. It will be appreciated that since the spray nozzles 38 are supported in depending relation to the end body below at and in a close relation to the spray boom liquid supply conduit 14 they are substantially protected from contact or damage upon folding of sections of the spray boom into a stored position.

In keeping with a further feature of the present embodiment, each spray nozzle 38 has a respective check valve 55 mounted in transverse rearwardly extending relation to the spray nozzle 38 also for protective positioning below the boom liquid supply conduit 14, In the illustrated embodiment, each check valve 55 is electronically operated for individually controlling the liquid flow to the respective spray nozzle 38 from a control in the cabin of the tractor 12 during transport through a field. The electronic check valve 55 may be of a type commercially available, such as a model no, 115880 sold under the name Chemsaver. Since such electronic check valves are substantially larger in size than commonly used spring actuated check valves their protrusion from the spray nozzle assembly heretofore increased their susceptibility to damaging interference during operation or transport of the spray boom. They also require external wiring communicating through the spray nozzle assemblies.

The illustrated check valves 55 each are mounted on an externally threaded transversely extending hub 58 of the respective end body 40 by a threaded cap 59. For communicating liquid from the Y body passage 41, the end body 40 is formed with an annular liquid flow passage 60 communicating with the liquid passage 41 of the Y body liquid supply leg 36 upon which it is mounted (FIGS. 7 and 8). The end body 40 further has an internal liquid passage 61 centrally within the annular passage 60 communicating with the mounting stem passage 62 and spray nozzle 51. In the illustrated embodiment, the check valve 55 has a plunger 62 (FIGS. 7 and 8) that is electrically moveable between (1) an open retracted position in which pressurized liquid from the spray boom liquid conduit 14, inlet section passage 20, Y body passage 41, and end body annular passage 60 communicates through the central passage 61 to the mounting stem passage 51 and spray nozzle 38 (2) and to a closed position blocking communication of liquid to the internal liquid passage 61, and hence, to the spray nozzle 38. It will be understood by a person skilled in the art that through controlled operation of the electronic check valve plunger 62, the liquid discharge for spray nozzle 38 can be selectively controlled for particular spray applications.

While the illustrative embodiment includes electronic check valves 55, it will be understood that other forms of check valves could be used, including spring actuated check valves and pneumatically controlled check valves. In either case, the check valves are supported in transverse rearwardly disposed relation to the spray nozzles 38 so as not protrude outwardly or increase the transverse footprint of the spray nozzle assembly 11. They therefore are less susceptible to interfering contact with other spray nozzles or sections of the boom upon movement of the boom sections into stored or travel positions or during operation of the spray boom.

Figure 9:
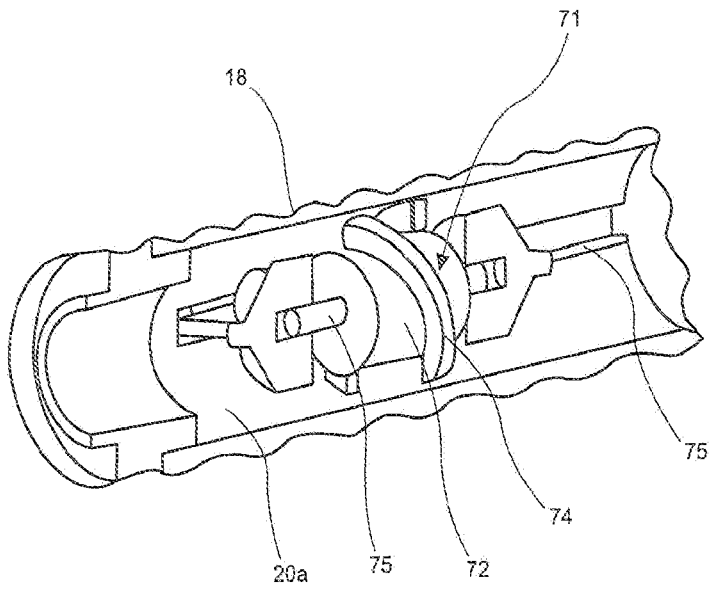
FIG. 9 is an enlarged perspective of a turbine operated liquid flow monitor of the illustrated spray nozzle assembly.
Figure 10:
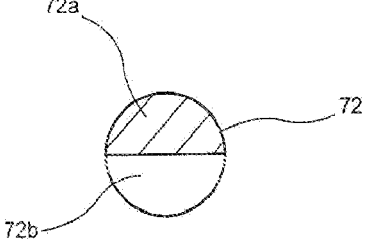
FIG. 10 is an enlarged transverse section of the magnetic hub of the turbine operated liquid flow monitor shown in FIG. 9.

In carrying out still a further feature of the present embodiment, each spray nozzle assembly 11 includes a respective liquid flow monitor 70 in the liquid inlet passage 20 of the inlet section 18 operable monitoring the flow rate to the spray nozzles 38 and determining possible clogging in the liquid supply passages from the inlet section 18 to the spray nozzles 30 (FIGS. 6 and 7). The liquid flow monitor 70 includes a turbine 71 (FIG. 9) disposed within the forwardly extending passage 20*b* of the inlet section 18 and arranged to rotate as an incident the liquid flow through the turbine 71 to the spray nozzles 38. The turbine 71 includes a central liquid hub 72 and a radially projecting cylindrical vane 74 for parting rotative spinning movement to the turbine as an incident to liquid flow. The turbine 71 has outwardly extending shaft segments 75 at opposite ends supported within respective web configured supports in the inlet section passage 20*a*. The cylindrical hub 72 carries a magnet (FIG. 10) one half 72*a* of which is polarized north and different form the opposite half 72*b* such that magnetic fields can be sensed by a control as an incident to rotation of the hub 72 from liquid flow. It will be understood that such flow monitor 70 may be used both for monitoring the application of chemicals during operation of the spray boom as well as sensing blockage of liquid passage to one or the other of the Y body passages 41 to the spray nozzles 38.

From the foregoing, it can be seen that a liquid spray boom is provided having liquid spray nozzle assemblies each including multiple spray nozzles with a respective associated liquid check or control valve. The check valves may be relatively large electronic control and check valves operable for individually controlled discharge from the respective nozzle. The spray nozzle assemblies have a compact design for more reliably permitting folding of the spray boom into a stored or travel position without interfering or damaging contact between the spray nozzle assemblies. The electronic check valves are mounted below the spray boom liquid supply conduit in protected fashion and in a manner that enables efficient electrical wiring of the check valves. While in the illustrated embodiment, the check valve and spray nozzle supporting end bodies are separate components releasably assembled on the Y body legs, alternatively, the Y body and end bodies could be integrally formed.

What is claimed is:

1. A liquid spraying system comprising;
   a horizontally supported elongated spray boom having a liquid supply conduit;
   a plurality of spray nozzle assemblies mounted in spaced relation along said elongated spray boom;
   said spray boom having a top side, a bottom side, and front and back lateral sides;
   said spray nozzle assemblies being mounted laterally away from one of said lateral sides on a common side of said spray boom;

said spray nozzle assemblies each include a liquid inlet section supported in dependent relation to said elongated spray boom having a liquid passage communicating with said spray boom liquid supply conduit and a pair of spray nozzle support legs extending laterally away from said common lateral side of said spray boom;
   said spray nozzle support legs each having a respective liquid passage communicating with the liquid passage of said liquid inlet section;
   a spray nozzle removably mounted on each said spray nozzle support leg for receiving and spraying liquid from said liquid supply conduit via said nozzle body liquid inlet section and a respective spray nozzle support leg liquid passage;
   said spray nozzle support legs each supporting a respective check valve in laterally closer relation to the elongated spray boom than the spray nozzle supported by the respective spray nozzles support legs; and
   said check valve being operable for interrupting flow of liquid from the spray nozzle support leg liquid passage to the spray nozzle supported by the respective spray nozzle support leg.

2. The liquid spraying system of claim 1 in which said spray nozzle support legs support the respective spray nozzles in depending relation to said spray nozzle support legs.

3. The liquid spraying system of claim 1 in which said spray nozzle support legs are defined by a Y shaped body removably coupled to said liquid inlet section.

4. The liquid spraying system of claim 3 in which said Y shaped body has an end body removably coupled to a terminal end of each spray nozzle support leg, and said spray nozzle and check valve supported by each spray nozzle support leg is removably coupled to a respective end body.

5. The liquid spraying system of claim 4 in which said Y shaped body is releasably coupled to said liquid inlet section by a threadless clip, and said end bodies each are releasably connected to a terminal end of a respective spray nozzle support leg by a releasable clip.

6. The liquid spraying system of claim 4 in which each said end body has an annular passage communicating with the spray nozzle support leg liquid passage of the respective spray nozzle support leg upon which it is mounted and an internal passage within said annular passage communicating with the respective spray nozzle supported by the end body, and each said check valve mounted on the respective end body being operable for closing said end body annular passage to prevent communication of liquid from said boom liquid supply conduit, liquid inlet section and the liquid passage of the spray nozzle support leg upon which the spray nozzle is mounted.

7. The liquid spraying system of claim 1 in which said spray nozzle support legs extend outwardly from said liquid inlet section at an angle between 30 and 60 degrees with respect to each other.

8. The liquid spraying system of claim 1 including a liquid flow monitor disposed within said liquid inlet section for monitoring the flow rate of liquid to said spray nozzles.

9. A liquid spraying system comprising;
   a horizontally supported elongated spray boom having a liquid supply conduit;
   a plurality of spray nozzle assemblies mounted in laterally spaced relation along a common side of said elongated spray boom;
   said spray boom having a top side, a bottom side, and front and back lateral sides;

said spray nozzle assemblies being mounted laterally away from one of said lateral sides on a common side of said spray boom;

said spray nozzle assemblies each including a Y shaped nozzle body supported by said spray boom;

said Y shaped body having a liquid inlet section communicating with said liquid supply conduit and a pair of legs extending laterally away from said liquid inlet section at an acute angle to each other;

said Y shaped body legs each having a respective liquid passage communicating with said Y shaped body liquid inlet section;

a spray nozzle removably mounted on each said Y shaped body leg for receiving and spraying liquid from said liquid supply conduit via said Y shaped body liquid inlet section and a respective Y shaped body leg liquid passage;

said Y shaped body legs each supporting a respective check valve in laterally closer relation to the elongated spray boom than the spray nozzle supported by the respective spray nozzles support legs; and said check valve being operable for interrupting flow of liquid from the respective Y shaped body leg passage to the spray nozzle supported by the respective Y shaped body leg.

10. The liquid spraying system of claim 9 in which said Y shaped body is supported in depending relation to said spray boom.

11. The liquid spraying system of claim 9 in which said Y shaped body includes an end body at the terminal end of each Y shaped body leg, said end body of each Y shaped body leg supporting a respective one of said spray nozzles in depending relation to the Y shaped body leg and a respective check valve in rearward relation to the respective spray nozzle.

12. The liquid spraying system of claim 11 in which said Y shaped body and end bodies are separate components releasably secured together.

13. The liquid spraying system of claim 12 in which said end bodies each are releasably connected to a terminal end of a respective Y shaped body leg by a releasable clip.

14. The liquid spraying system of claim 11 in which each said end body has an annular passage communicating with the liquid passage of the respective Y shaped body leg upon which it is mounted and an internal passage within said annular passage communicating with an inlet passage to the respective spray nozzle supported by the end body, and each said check valve mounted on the respective end body being operable for closing said end body internal passage to prevent communication of liquid from said boom liquid supply conduit, and Y shaped body leg passage of the Y shaped body leg upon which it is mounted.

15. The liquid spraying system of claim 14 in which said check valves each is an electronic operated check valve.

16. The liquid spraying system of claim 9 in which said Y shaped body legs extend outwardly at an angle between 30 and 60 degrees with respect to each other.

17. The liquid spraying system of claim 16 in which said Y shaped body legs extend outwardly at an angle of about 45 degrees with respect to each other.

18. The liquid spraying system of claim 9 in which said Y shaped body legs each support the respective spray nozzle in forward relation to said spray boom and the check valve rearwardly of the respective spray nozzle.

* * * * *